(12) United States Patent
Sasaki

(10) Patent No.: US 6,333,841 B1
(45) Date of Patent: Dec. 25, 2001

(54) THIN FILM MAGNETIC HEAD AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/328,415

(22) Filed: Jun. 9, 1999

(30) Foreign Application Priority Data

Jun. 11, 1998 (JP) .................................................. 10-163676

(51) Int. Cl.[7] .............................. G11B 5/39; G11B 5/147
(52) U.S. Cl. .......................................... 360/317; 360/126
(58) Field of Search ................................. 360/122, 317, 360/126

(56) References Cited

U.S. PATENT DOCUMENTS

| | | | | |
|---|---|---|---|---|
| 5,325,254 | * | 6/1994 | Cooperrider ........................ | 360/126 |
| 5,438,747 | | 8/1995 | Krounbi et al. . | |
| 5,691,867 | * | 11/1997 | Onuma et al. ...................... | 360/126 |
| 5,793,578 | * | 8/1998 | Heim et al. ......................... | 360/126 |
| 5,805,391 | * | 9/1998 | Chang et al. ....................... | 360/113 |
| 6,018,862 | * | 2/2000 | Stageberg et al. ................ | 29/603.14 |
| 6,043,959 | * | 3/2000 | Crue et al. .......................... | 360/113 |
| 6,118,629 | * | 9/2000 | Huai et al. .......................... | 360/126 |
| 6,122,144 | * | 9/2000 | Chang et al. ....................... | 360/122 |
| 6,130,809 | * | 10/2000 | Santini ................................ | 360/317 |
| 6,137,652 | * | 10/2000 | Ezaki et al. ........................ | 360/113 |
| 6,151,193 | * | 11/2000 | Terunuma et al. ................ | 360/126 |
| 6,154,346 | * | 11/2000 | Sasaki ................................ | 360/317 |
| 6,154,347 | * | 11/2000 | Sasaki ................................ | 360/317 |
| 6,172,848 | * | 1/2001 | Santini ............................... | 360/126 |

FOREIGN PATENT DOCUMENTS

| | | |
|---|---|---|
| A-60-10409 | 1/1985 | (JP) . |
| A-62-245509 | 10/1987 | (JP) . |
| A-7-262519 | 10/1995 | (JP) . |

* cited by examiner

*Primary Examiner*—William Klimowicz
(74) *Attorney, Agent, or Firm*—Oliff Berridge, PLC

(57) ABSTRACT

It is an object of the invention to enable fine processing of not only a pole tip but a top pole layer to submicron measurement among the top pole which is divided into two. In the invention, the top pole is divided to the pole tip and the top pole layer, and a pole tip is formed on the flat surface of a bottom pole with a write gap layer in between. Through this, the pole tip which controls a recording track width is processed to submicron measurement. An insulating layer is formed in a region adjacent to the pole tip. A first layer of thin film coil is formed in a region where the insulating layer is formed. The thin film coil is covered by the insulating layer whose surface is flattened. As a result, difference in height of an apex area including a thin film coil becomes less for the size of (first layer of) thin film coil comparing to that of the related art. Accordingly, an effect of difference in height of the apex area is decreased when the top pole layer is formed by photolithography. As a result, micronizing the top pole layer to submicron measurement becomes possible.

15 Claims, 10 Drawing Sheets

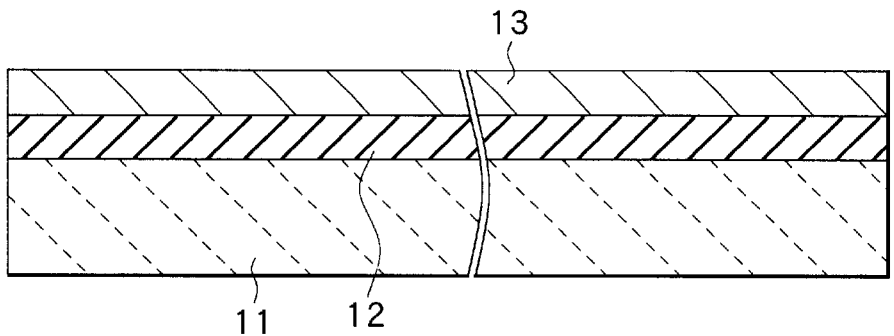
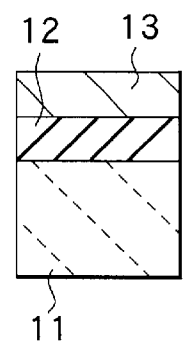
FIG.1A  FIG.1B
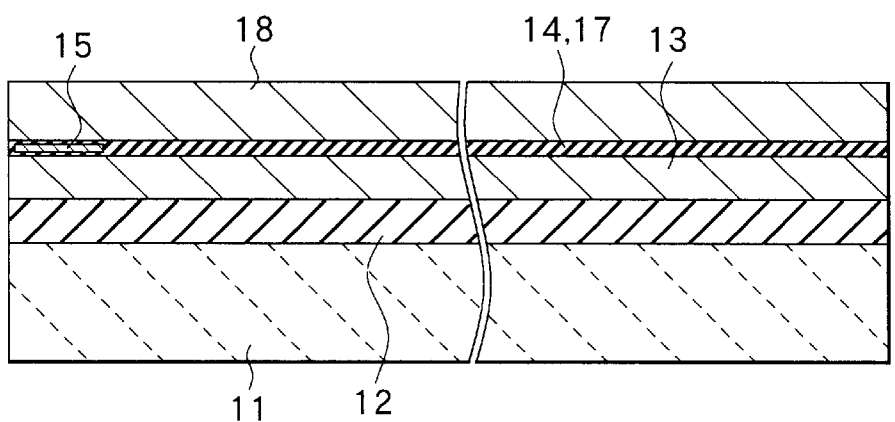
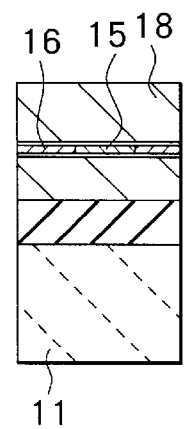
FIG.2A  FIG.2B
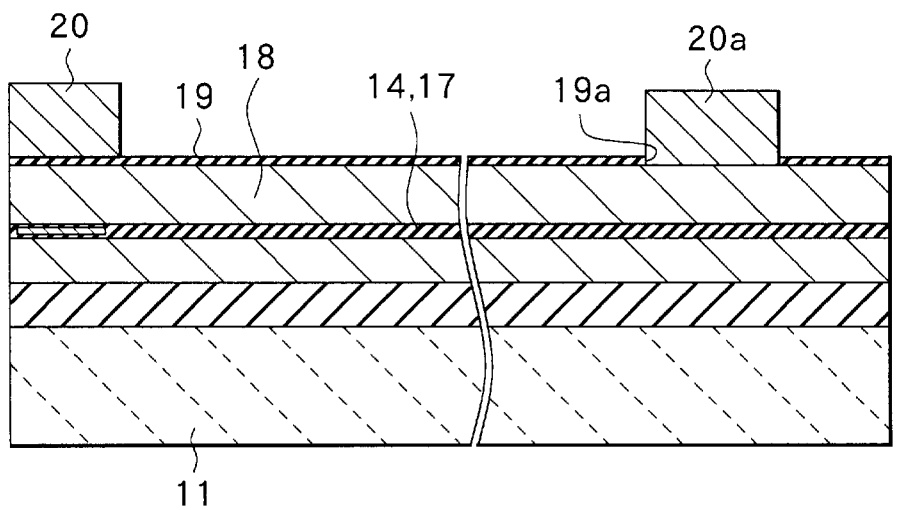
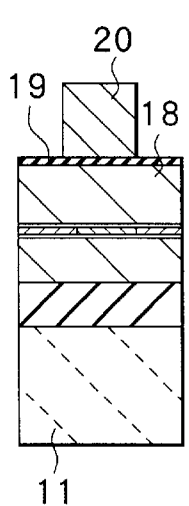
FIG.3A  FIG.3B

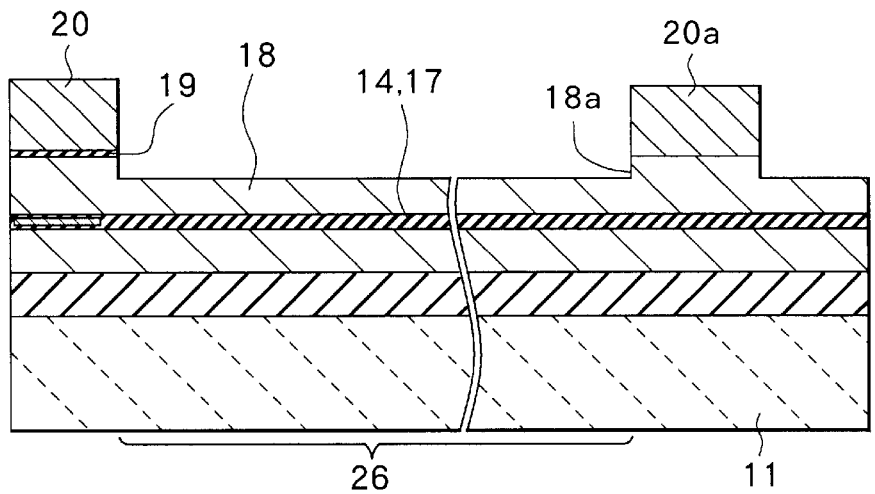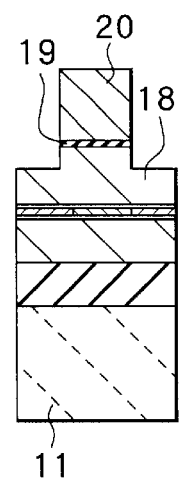
FIG.4A  FIG.4B
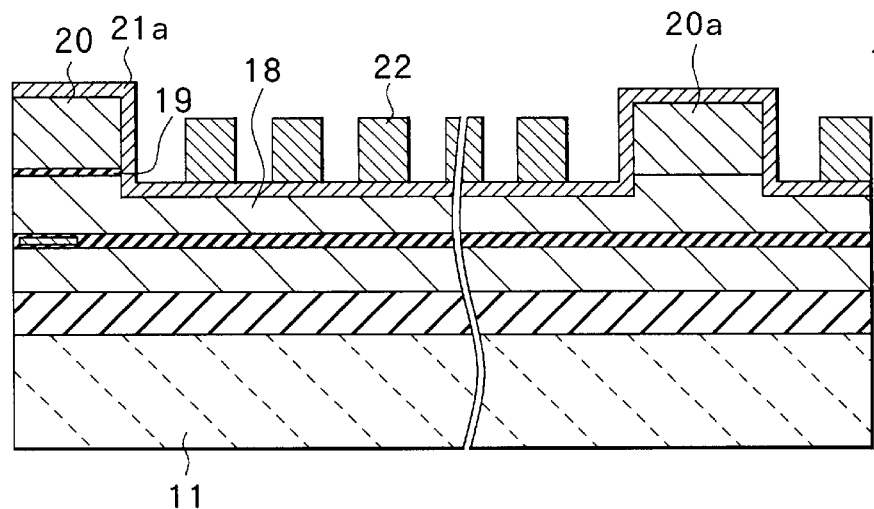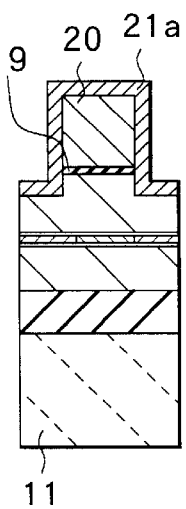
FIG.5A  FIG.5B

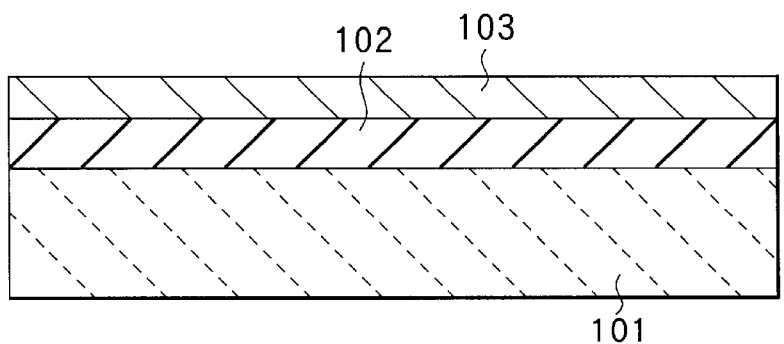
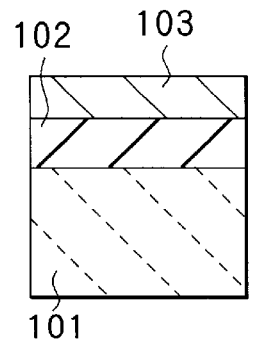
FIG.16A  FIG.16B
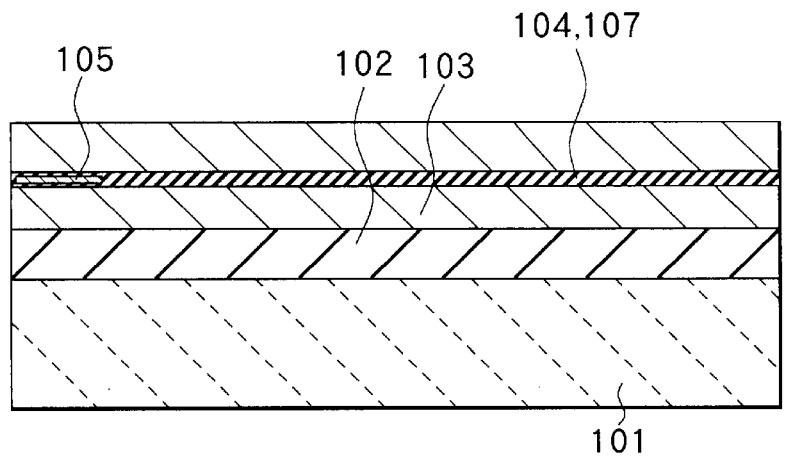
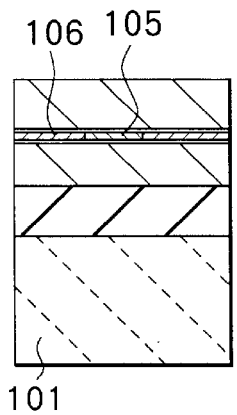
FIG.17A  FIG.17B
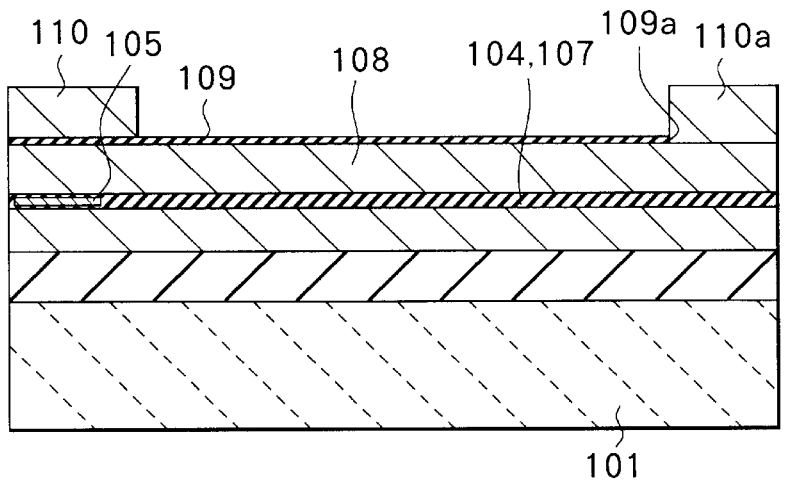
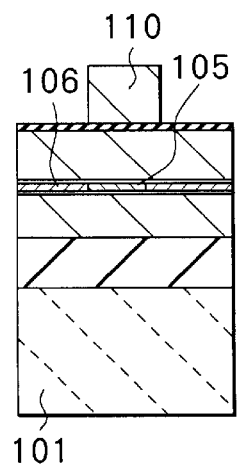
FIG.18A  FIG.18B

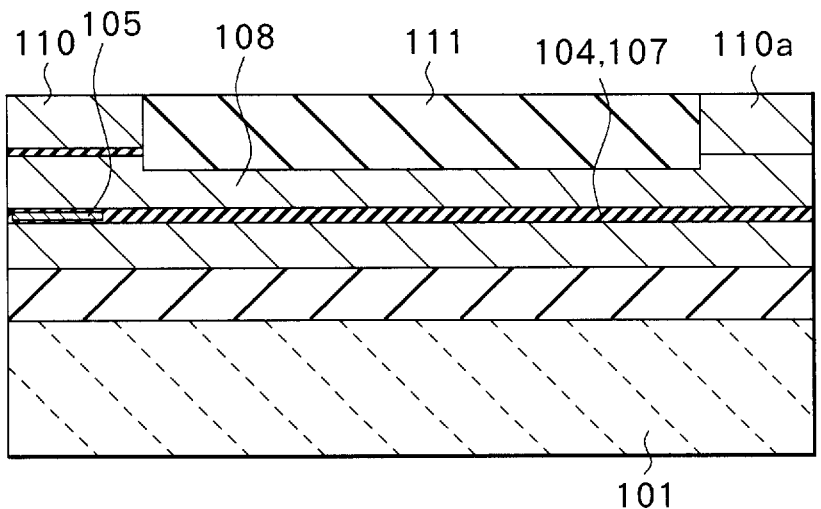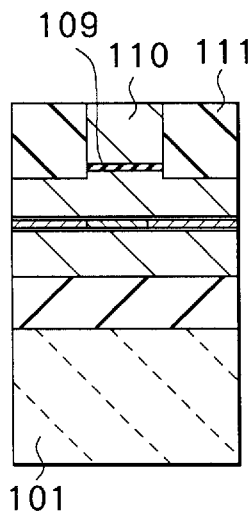
FIG.19A          FIG.19B
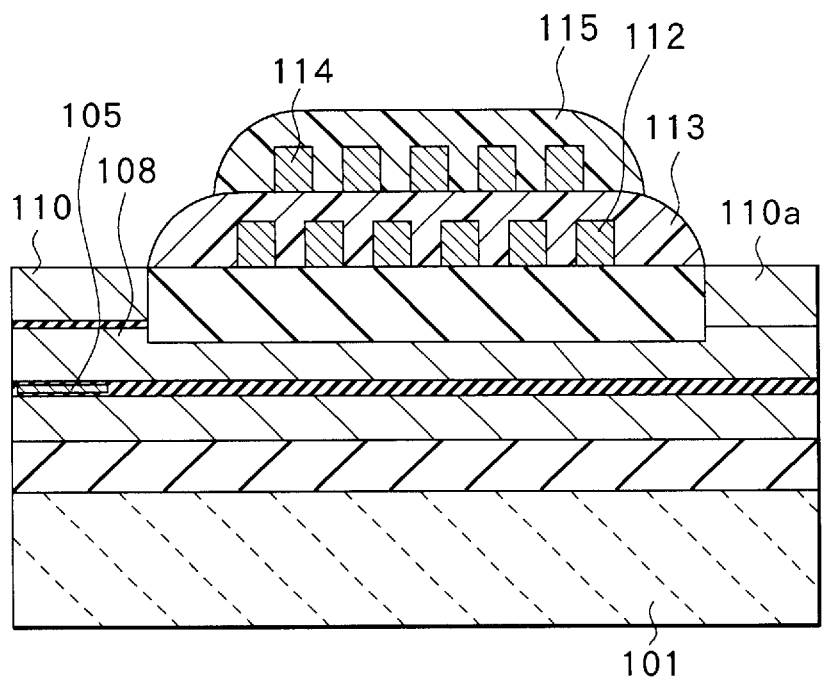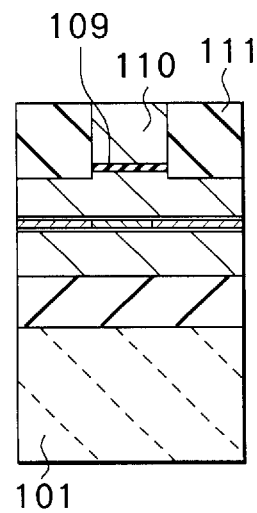
FIG.20A          FIG.20B

THIN FILM MAGNETIC HEAD AND METHOD OF MANUFACTURING THE SAME

BACKGROUND OF THE INVENTION

1. Field of the Invention

The invention relates to a thin film magnetic head having at least an inductive-type magnetic transducer for writing and a method of manufacturing the same.

2. Description of the Related Art

Performance improvement in thin film magnetic heads has been sought in accordance with an increase in surface recording density of a hard disk device. A composite thin film magnetic head, which is made of a layered structure including a recording head with an inductive-type magnetic transducer for writing and a reproducing head with a magnetoresistive (MR) element for reading, is widely used as a thin film magnetic head. As MR elements there are an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using the GMR element is called a GMR head. The AMR head is used as a reproducing head whose surface recording density is more than 1 gigabit per square inch. The GMR head is used as a reproducing head whose surface recording density is more than 3 gigabit per square inch.

The AMAR head includes an AMR film having an AMR effect. In a GMR head the AMR film is replaced with a GMR film having the GMR effect and the configuration of the GMR head is similar to that of the AMR head. However, the GMR film exhibits a greater change in resistance under a specific external magnetic field compared to the AMR film. Therefore, the reproducing output of the GMR head becomes about three to five times greater than that of the AMR head.

An MR film may be changed in order to improve the performance of a reproducing head. In general, an AMR film is a film made of a magnetic substance which exhibits the MR effect and has a single-layered structure. In contrast, many of the GMR films have a multi-layered structure consisting a plurality of films. There are several types of mechanisms which produce the GMR effect. The layer structure of the GMR film depends on those mechanisms. GMR films include a superlattice GMR film, a granular film, a spin valve film and so on. The spin valve film is most sufficient since the film has a relatively simple structure, exhibits a great change in resistance in a low magnetic field, and is suitable for mass production. The performance of a reproducing head is thus easily improved by changing an AMR film with a GMR film and the like with an excellent magnetoresistive sensitivity.

As a primary factor for determining the performance of a reproducing head, there is a pattern width, especially an MR height. The MR height is the length (height) between the end of an MR element closer to an air bearing surface and the other end. The MR height is originally controlled by an amount of grinding when the air bearing surface is processed. The air bearing surface (ABS) here is a surface of a thin film magnetic head that faces a magnetic recording medium and is also called a track surface.

Performance improvement in a recording head have also been expected in accordance with the performance improvement in a reproducing head. It is required to increase the track density of a magnetic recording medium in order to increase the recording density among the performance of a recording head. In order to achieve this, a recording head with a narrow track structure in which the width of a bottom pole and a top pole sandwiching a write gap on the air bearing surface is required to be reduced to the order of some microns to submicron. Semiconductor process technique is used to achieve the narrow track structure.

Another factor which determines the performance of a recording head is the throat height (TH). The throat height is the length (height) of a portion (magnetic pole portion) which is from the air bearing surface to an edge of an insulating layer which electrically isolates the thin film coil. Reducing the throat height is desired in order to improve the performance of a recording head. The throat height is also controlled by an amount of grinding when the air bearing surface is processed.

In order to improve the performance of a thin film magnetic head, it is important to form the recording head and the reproducing head as described in well balance.

Here, an example of a method of manufacturing a composite thin film magnetic head will be described with reference to FIGS. 16A, 16B to FIGS. 21A, 21B as an example of a method of manufacturing a thin film magnetic head of the related art.

As shown in FIG. 16, an insulating layer 102 made of, for example, alumina (aluminum oxide, $Al_2O_3$) is formed to a thickness of about 5 to 10 $\mu$m on a substrate 101 made of, for example, aluminum oxide and titanium carbide ($Al_2O_3$ TiC). Further, a bottom shield layer 103 for a reproducing head made of, for example, permalloy (NiFe) is formed on the insulating layer 102.

Next, as shown in FIG. 17, for example, alumina of about 100–200 nm in thickness is deposited on the bottom shield layer 103 to form a shield gap film 104. Next, an MR film 105 of tens of nanometers in thickness for making up the MR element for reproducing is formed on the shield gap film 104, and photolithography with high precision is applied to obtain a desired shape. Next, a lead terminal layer 106 for the MR film 105 is formed by lift-off method. Next, a shield gap film 107 is formed on the shield gap film 104, the MR film 105 and the lead terminal layer 106, and the MR film 105 and the lead terminal layer 106 are buried in the shield gap films 104 and 107. Next, a top shield-cum-bottom pole (called bottom pole in the followings) 108 of about 3 $\mu$m in thickness made of, for example, permalloy (NiFe), which is a material used for both of the reproducing head and the recording head, is formed on the shield gap film 107.

Next, as shown in FIG. 18, a write gap layer 109 of about 200 nm in thickness made of an insulating layer such as an alumina film is formed on the bottom pole 108. Further, an opening 109a for connecting the top pole and the bottom pole is formed through patterning the write gap layer 109 by photolithography. Next, a pole tip 110 is formed with magnetic materials made of permalloy (NiFe) and nitride ferrous (FeN) through plating method, while a connecting-portion pattern 110a of the top pole and the bottom pole is formed. The bottom pole 108 and a top pole layer 116 which is to be described later are connected by the connecting-portion pattern 110a and so that forming a through hole after CMP (Chemical and Mechanical Polishing) procedure, which is to be described later, becomes easier.

Next, as shown in FIG. 19, the write gap layer 109 and the bottom pole 108 are etched about 0.3–0.5 $\mu$m by ion milling with the pole tip 110 being a mask. By etching the bottom pole 108 to be a trim structure, widening of effective write track width can be avoided (that is, suppressing spread of magnetic flux in the bottom pole when data is being written). Next, after an insulating layer 111 of about 3 μm, made of, for example, alumina is formed all over the surface, the whole surface is flattened by CMP.

Next, as shown in FIG. 20 a first layer of thin film coil 112 for an inductive-type recording head made of, for example, copper (Cu) is selectively formed on the insulating layer 111 by, for example, plating method. Further, a photoresist film 113 is formed in a desired pattern on the insulating layer 111 and the thin film coil 112 by photolithography with high precision. Further, a heat treatment of desired temperature is applied to flatten the photoresist film 113 and to insulate between the turns of the thin film coil 112. Likewise, a second layer of thin film coil 114 and a photoresist film 115 are formed on the photoresist film 113, and a heat treatment of desired temperature is applied to flatten the photoresist film 115 and to insulate between the turns of the thin film coils 114.

Next, as shown in FIG. 21, a top yoke-cum-top pole layer (called a top pole layer in the followings) 116 made of, for example, permalloy, which is a magnetic material for recording heads, is formed on the top pole 110, the photoresist films 113 and 115. The top pole layer 116 is in contact with the bottom pole 108 in a position recessed from the thin film coils 112 and 114, while being magnetically coupled to the bottom pole 108. Further, an over coat layer 117 made of, for example, alumina is formed on the top pole layer 116. At last, a track surface (air bearing surface) of the recording head and the reproducing head is formed through performing machine processing on the slider to complete a thin film magnetic head.

In FIG. 21, TH represents the throat height and MR-H represents the MR height. Further, P2W represents the track (magnetic pole) width.

As an factor for determining the performance of a thin film magnetic head, there is an apex angle as represented by θ in FIG. 21 besides the throat height TH and the MR height MR-H and so on. The apex angle is an angle between a line connecting the corner of a side surface of the track surface of the photoresist films 113, 115 and an upper surface of the top pole layer 116.

To improve the performance of a thin film magnetic head, it is important to precisely form the throat height TH, the MR height MR-H and the apex angle θ as shown in FIG. 21

In the application, problems regarding precise control of a track width P2W will be specifically discussed. That is, precise formation of the track width P2W is required since it determines a track width of a recording head. Especially in these years, submicron measurement of 1.0 μm or less is required in order to make a high surface density recording possible, that is, to form a recording head with a narrow track structure. To achieve this, a technique for processing a top pole to submicron using a semiconductor processing technique, and using magnetic materials having higher saturation flux density are desired.

Here, the problem is that it is difficult to minutely form the top pole layer 116 on a coil portion (apex area) which is protruded like a mountain covered with photoresist films (for example, the photoresist films 113 and 115 shown in FIG. 21).

As a method of forming the top pole, frame plating method is used as, disclosed in, for example, Japanese Patent Application laid-open in Hei 7-262519. When the top pole is formed by the frame plating method, first, a thin electrode film made of, for example, permalloy is formed all over the apex area. Next, a frame is formed by applying photoresist on it, and patterning it through photolithography. Further, the top pole is formed through plating method with the electrode film formed earlier being a seed layer.

By the way, there is, for example, 7–10 μm or more difference in height between the apex area and other areas. If the film thickness of the photoresist formed on the apex area is required to be 3 μm or more, a photoresist film of 8–10 μm or more in thickness is formed in the lower part of the apex area since the photoresist with liquidity gathers into a lower area. To form a narrow track as described, a pattern with submicron width is required to be formed with a photoresist film. Accordingly, forming a micro pattern with submicron width with a photoresist film of 8–10 μm or more in thickness is required, however, it has been extremely difficult.

Further, during an exposure of photolithography, a light for the exposure reflects by an electrode film made of, for example, permalloy, and the photoresist is exposed also by the reflecting light causing deformation of the photoresist pattern. As a result, the top pole can not be formed in a desired shape and so on, which means, its side walls take a shape of being rounded. As described, it has been extremely difficult with the related art to precisely control the track P2W and to precisely form the top pole to have a narrow track structure.

For the reasons described above, as shown in the procedure of an example of the related art in FIG. 18 to FIG. 21, a method of connecting the pole tip 110 and a yoke area-cum-top pole layer 116 after forming a track width of 1.0 μm or less with the pole tip 110 which is effective for forming a narrow track of a recording head, that is, a method of dividing the regular top pole into the pole tip 110 for determining the track width and the top pole layer 116 which becomes the yoke for inducing magnetic flux is employed (Ref Japanese Patent Application laid-open Sho 62-245509, Sho 60-10409). By dividing the top pole into two as described, the pole tip 110 can be minutely processed to submicron width on a flat surface of the write gap layer 109. The track width of the recording head is determined by the pole tip 110 so that the other top pole layer 116 is not required to be minutely processed comparing to the pole tip 110.

However, when the track width of the recording head becomes extremely fine, especially 0.5 μm or less, a process precision with submicron width is required in the top pole layer 116. That is, if the measurement difference in a lateral direction of the pole tip 110 and the top pole layer 116 is too significant when looking at them from the track surface 118 side, as described above, a side write occurs and a problem that writing is performed in a region other than the originally designated data recording region in a hard disk occurs. As a result, the effective track width becomes wider and a problem that writing is performed in a region other than the originally designated data recording region in a hard disk occurs.

As a result, not only the pole tip 110 but also the top pole layer 116 is required to be processed to the submicron width, however, it is difficult to perform fine-process of the top pole layer 116 since there is a significant difference in heights as described above in the apex area under the top pole layer 116.

The invention is designed to overcome the foregoing problems. It is an object to provide a thin film magnetic head in which not only the pole tip but also the top pole layer can be minutely processed to submicron width while the performance of the recording head is especially improved, and a method of manufacturing the same.

SUMMARY OF THE INVENTION

A thin film magnetic head of the invention having at least two magnetic layers including at least a first magnetic pole and a second magnetic pole being magnetically coupled to each other while part of sides facing a recording medium face each other with a write gap layer in between, and having one or two layers or more of thin film coils for generating magnetic flux; comprises: a first magnetic layer including the first magnetic pole; a pole tip for forming the second magnetic pole; a first insulating layer formed extendedly at least from the surfaces of the pole tip and the write gap layer which are opposite of sides facing the recording medium to one of the surface of the first magnetic layer; at least one layer of thin film coil with at least part of its film-thickness direction being formed in a region where the first insulating layer is formed; a second insulating layer formed at least between turns of the thin film coil; and a second magnetic layer formed to cover at least part of the thin film magnetic coil while being connected to at least part of the surface of the pole tip which is opposite of the neighboring surface of the write gap layer.

Further, a method of manufacturing a thin film magnetic head of the invention having at least two magnetic layers including at least a first magnetic pole and a second magnetic pole being magnetically coupled to each other while part of sides facing a recording medium face each other with a write gap layer in between, and having one or two layers or more of thin film coils for generating magnetic flux; includes steps of: selectively forming a pole tip for composing a second magnetic pole at least on a first magnetic pole of a first magnetic layer with a write gap layer in between, after forming the first magnetic layer including the first magnetic pole; forming a first insulating layer extendedly at least from the surfaces of the pole tip and the write gap layer which are opposite of a side facing the recording medium to one of the surfaces of the first magnetic layer; forming at least one layer of thin film coil with at least part of its film thickness direction being formed in a region where the first insulating layer is formed; forming a second insulating layer at least between turns of the thin film coil; and forming a second magnetic layer which is connected to at least part of a surface of the pole tip which is opposite of a neighboring surface of the write gap layer while being made to cover at least part of the thin film coil.

In the method of manufacturing a thin film magnetic head of the invention, a first insulating layer is formed from surfaces of the pole tip and the write gap layer which are opposite of a side facing the recording medium to one of the surface of the magnetic layer while a thin film coil is formed in a region where the first insulating layer is formed. Further, between the turns of the thin film coil is buried with a second insulating layer so that difference in height of the apex area including the coil becomes smaller comparing to that of the related art. That is, difference in thickness of photoresist films in the top and the bottom of the apex area is decreased when a second magnetic layer (top pole layer), which is in contact with the pole tip as a second magnetic pole, is formed by photolithography technique. As a result, the second magnetic layer is also micronized to submicron measurement together with the pole tip which is formed on the first magnetic layer (bottom pole) with the flattened write gap layer in between.

In the method of manufacturing a thin film magnetic head of the invention, it is preferable to have conditions described in the followings in addition to the above-mentioned configuration.

That is, in the thin film magnetic head of the invention, it is preferable to form the first insulating layer being formed further along both sides of the pole tip except the edge surface of a side facing the recording medium while further forming the first insulating layer extendedly from the surface of the pole tip which is opposite of a side facing the recording medium to the surface of the second magnetic layer which is opposite of a side facing the recording medium.

Further, in the thin film magnetic head of the invention, it is preferable to form the whole portion of the film-thickness direction of the thin film coil in a region where the first insulating layer is formed while forming the surface of the thin film coil which is opposite of the neighboring surface of the first insulating layer to be substantially the same surface as the surface of the pole tip which is opposite of the neighboring surface of the write gap layer.

Here, in the invention, "to be substantially the same surface" means not only a case where the surface of the thin film coil which is opposite of the neighboring surface of the first insulating layer perfectly forms the same surface as the surface of the pole tip which is opposite of the neighboring surface of the write gap layer, but a case where a small step (a step of about 10–20% in thickness of a layer forming the thin film coil) is formed between them.

Further, in the thin film magnetic head of the invention, it is preferable to form the first insulating layer with an inorganic insulating material.

Further, in the thin film magnetic head of the invention, it is desired to have a configuration in which the write gap layer is placed in part of region between the first magnetic layer and the first insulating layer, the concave area is formed at least on the surface of the pole tip side of the first magnetic layer and, further, the first insulating layer is formed on the surface of the concave area of the first magnetic layer which is opposite of a side facing the recording medium.

Further, in the thin film magnetic head of the invention, it is preferable to form the second insulating layer to be substantially the same surface as the surface of the pole tip which is opposite of the neighboring surface of the write gap layer. Further, it is preferable to form the second insulating layer also between the first insulating layer and the thin film coil.

Further, in the thin film magnetic head of the invention, it is preferable to have a configuration in which at lest one layer of the thin film coil formed by being covered with an insulating layer other than the first and the second insulating layers is provided between the second insulating layer and the second magnetic layer. Further, it is preferable that the number of the turns of the thin film coil of the most outer side which is formed closest to the second magnetic layer among the thin film coil is less than that of the rest of the thin film coils, and form the slope of the insulating layer which covers the thin film coil of the most outer side and determines the apex angle is made to be gentle.

Further, in the thin film magnetic head of the invention, it is desired to have a configuration in which the thin film coil covered by the first insulating layer and the second insulating layer, and the thin film coil covered by the other insulating layer are electrically connected in the boundary surface of the second insulating layer and the other insulating layer. Further, it is desired to form width of the side of the pole tip which is opposite of a side facing the recording medium wider than that of a side facing the recording medium. Further, in the thin film magnetic head of the invention, it may be formed including a magnetoresistve element for reading-out.

Further, in the method of manufacturing a thin film magnetic head of the invention, after covering the whole surface including the pole tip and the thin film coil, it is desired to include a step of flattening the surface of the thin film coil which is opposite of the neighboring surface of the first insulating layer in order to make it substantially the same surface as the surface of the pole tip which is opposite of the neighboring surface of the write gap. Further, it is preferable to include a step of forming the concave area on the first magnetic layer by selectively etching the surfaces of the write gap layer and the first magnetic layer using the top pole as a mask, after forming the write gap layer on the whole surface of the first magnetic layer and selectively forming the pole tip on the write gap layer.

Further, the method of manufacturing a thin film magnetic head of the invention may include a step of remaining part of the write gap layer when etching the write gap layer using the pole tip as a mask. Further, it may include a step of forming at least one layer of thin film coil covered by an insulating layer other than the first and the second insulating layers on the flattened second insulating layer.

Further, the method of manufacturing a thin film magnetic head may include a step of making the number of turns of thin film coil of the most outer side, which is formed closest to the second magnetic layer among the thin film coils, less than that of the rest of the thin film coils, and making the slope of the insulating layer gentle, which covers the thin film coil of the most outer side and determines the apex angle. Or, it may include a step of forming the second magnetic layer on the pole tip and the second insulating layer after selectively etching the surface of the pole tip to make it lower than the edge surface of the first insulating layer formed on the surface side of the pole tip.

DETAILED DESCRIPTION OF DRAWINGS

FIGS. 1A and 1B are cross sections for describing the procedure of manufacturing a thin film magnetic head according to a first embodiment of the invention.

FIGS. 2A and 2B are cross sections for describing the following procedure shown in FIGS. 1A and 1B.

FIGS. 3A and 3B are cross sections for describing the following procedure shown in FIGS. 2A and 2B.

FIGS. 4A and 4B are cross sections for describing the following procedure shown in FIGS. 3A and 3B.

FIGS. 5A and 5B are cross sections for describing the following procedure shown in FIGS. 4A and 4B.

FIGS. 16A and 16B are cross sections for describing a method of manufacturing a thin film magnetic head of the related art.

FIGS. 17A and 17B are cross sections for describing the following procedure shown in FIGS. 16A and 16B.

FIGS. 18A and 18B are cross sections for describing the following procedure shown in FIGS. 17A and 17B.

FIGS. 19A and 19B are cross sections for describing the following procedure shown in FIGS. 18A and 18B.

FIGS. 20A and 20B are cross sections for describing the following procedure shown in FIGS. 19A and 19B.

DETAILED DESCRIPTION OF THE PREFERRED EMBODIMENTS

Preferred embodiments of the invention will be described with reference to the drawings in the followings.

[First Embodiment]

FIGS. 1A, 1B to FIGS. 9A, 9B respectively show the procedure of manufacturing a composite thin film magnetic head as a thin film magnetic head according to a first embodiment of the invention. Further, in FIGS. 1A, 1B to FIGS. 9A, 9B, "A" shows a cross section vertical to the track surface (ABS) while "B" shows a cross section parallel to the track surface of the pole portion, respectively.

Figures 9A, 9B:
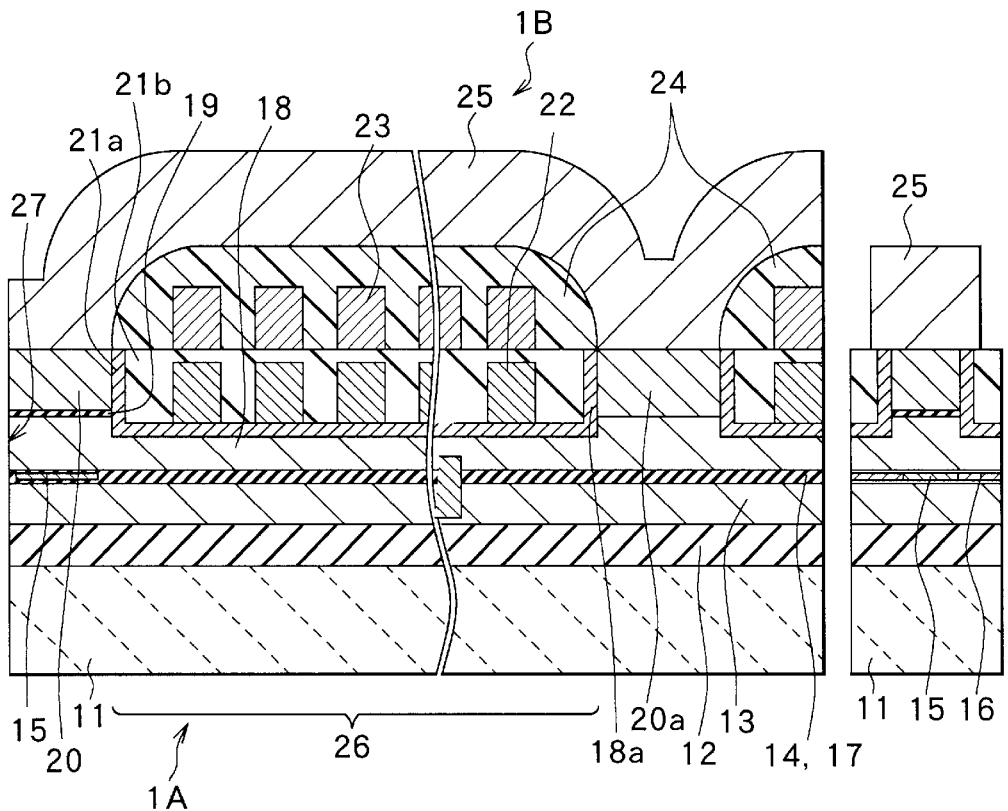
FIGS. 9A and 9B are cross sections for describing the following procedure shown in FIGS. 8A and 8B.

First, the configuration of a composite thin film magnetic head according to the embodiment will be described with reference to FIGS. 9A and 9B. The magnetic head comprises a magnetoresistive-effect reading head (called reading head in the followings) 1A for reproducing and a inductive recording head (called recording head in the followings) 1B for recording.

The reading head 1A is formed by a pattern of a magnetoresistive effect layer (called MR film in the followings) 15 formed on a substrate 11 made of, for example, altic ($Al_2O_3$ TiC) with an insulating layer 12 formed with, for example, alumina (aluminum oxide, $Al_2O_3$), a bottom shield layer 13 formed with, for example, ferrous aluminum silicide (FeAlSi) and a shield gap layer 14 formed with, for example, aluminum oxide ($Al_2O_3$, called alumina in the followings) in between in order. Further, a lead terminal layer 16 made of a material which does not diffuse onto the MR film such as tantalum (Ta) or tungsten (w) or the like is also formed on the shield gap layer 14, and the lead terminal layer 16 is electrically connected to the MR film 15. The MR film 15 is formed with various kinds of materials having magnetoresistive effect such as permalloy (NiFe alloy), nickel (Ni)—cobalt (Co) alloy and so on. A shield gap layer 17 made of, for example, almina is laminated on the MR film 15 and the lead terminal layer 16. That is, the MR film 15 and the lead terminal layer 16 are buried in the shield gap layers 14 and 17. Further, the MR film 15 may be an AMR film or a GMR film.

The recording head 1B is formed by forming a top pole on the reading head 1A with a bottom pole 18, which functions as a top shield layer for the MR film 15, and a write gap layer 19 in between. In the embodiment, the top pole is divided into two, comprising a pole tip 20 which is formed on the write gap layer 19 on the track-surface side, and a yoke-cum-top pole layer (top pole) 25 which is in contact with the pole tip 20 while being formed along the upper surface of the apex area. The bottom pole 18, the pole tip 20 and the top pole layer 25 are respectively formed with, for example, permalloy (NiFe). In the recording head 1B, the bottom pole 18 facing the pole tip 20 has a trim structure in which part of its surface is processed to be protruded. As a result, widening of effective write track width, that is, spread of magnetic flux in the bottom pole 18 at the time of writing data, can be suppressed.

In the embodiment, the bottom pole 18 corresponds to the first magnetic pole and the first magnetic layer of the invention, the pole tip 20 to the second magnetic pole of the invention, and the top pole layer 25 to the second magnetic layer of the invention, respectively.

In the embodiment, the region adjacent to the pole tip 20, the write gap layer 19 and portion of the bottom pole 18 which is processed to be protruded is referred as a coil forming region 26. That is, the coil forming region 26 corresponds to a region which includes a concave area 18a formed by etching the surfaces of the write gap layer 19 and the bottom pole 18 with the pole tip 20 being a mask. An insulating layer 21a is formed on an inner-wall surface (bottom surface and sidewall surface) of the coil forming region 26. A first layer of thin film coil 22 is formed on the insulating layer 21a. An insulating layer 21b is buried in between the coils of the thin film coil 22, and between the thin film coil 22 and the insulating layer 21a. Further, the surfaces of the insulating layer 21b and the pole tip 20 are flattened to form the same surface. Accordingly, difference in height of the apex area including a thin film coil, which is to be described later, becomes smaller for the size of the thin film coil 22. Further, the insulating layer 21a corresponds to the first insulating layer of the invention while the insulating layer 21b corresponds to the second insulating layer of the invention, respectively.

A second layer of thin film coil 23 is formed on the flattened insulating layer 21b, and the thin film coil 23 is covered by an insulating layer 24 made of, for example, photoresist. The insulating layer 24 corresponds to another insulating layer of the invention. The yoke-cum-top pole layer 25 is formed on the insulating layer 24. The top pole layer 25 is in contact with the bottom pole 18 in a position recessed from the thin film coils 22 and 23, with a connecting-portion pattern 20a formed through the same procedure as the pole tip 20, which is to be described later, in between. The top pole layer 25 is covered by an over coat layer (not shown in figure). Further, the thin film coils 22 and 23 are electrically connected to the insulating layer 21b and the insulating layer 24 in the boundary surface.

In the magnetic head, reading out information from a magnetic disk (not shown in figure) is performed in the reading head 1A using magnetoresistive effect of the MR film 15 while writing information to a magnetic disk is performed in the recording head 1B using a change in magnetic flux between the pole tip 20 and the bottom pole 18 by the thin film coils 22 and 23.

Next, a method of manufacturing the above-mentioned composite thin film magnetic head will be described.

In the manufacturing method according to the embodiment, first, as shown in FIG. 1, the insulating layer 12 made of, for example, alumina ($Al_2O_3$) is formed to a thickness of about 3–5 $\mu$m on the substrate 11 made of, for example, altic ($Al_2O_3$ TiC) by, for example, sputtering method. Next, a bottom shield layer 13 for a reproducing head is formed by selectively forming permalloy of about 3 $\mu$m in thickness on the insulating layer 12 by plating method using a photoresist film as a mask. Further, an alumina film (not shown in figure) of about 4–6 $\mu$m in thickness is formed by sputtering or CVD (Chemical Vapor Deposition) method, and is flattened by CMP (Chemical and Mechanical Polishing).

Next, as shown in FIG. 2, a shield gap layer 14 is formed on the bottom shield layer 13 by depositing, for example, alumina to 100–200 nm in thickness. Further, an MR film 15 for forming a GMR element or an MR element for reproduction is formed to tens of nanometers in thickness on the shield gap layer 14 and is processed to be a desired shape by photolithography with high precision. Further, a lead terminal layer 16 corresponding to the MR film 15 is formed by lift-off method. Next, a shield gap layer 17 is formed on the shield gap layer 14, the MR film 15 and the lead terminal layer 16, and the MR film 15 and the lead terminal layer 16 are buried in the shield gap layers 14 and 17.

Further, a top shield-cum-bottom pole 18 made of permalloy (NiFe) is formed to about 3–4 $\mu$m in thickness on the shield gap layer 17.

Next, as shown in FIG. 3, a write gap layer 19 of 0.2–0.3 $\mu$m in thickness, which is made of an insulating material such as alumina, is formed on the bottom pole 18 by, for example, sputtering method. The write gap layer 19 may be formed with materials such as aluminum nitride (AlN), silicon oxide, silicon nitride and the like, other than alumina. Further, an opening 19a for connecting the top pole and the bottom pole is formed through patterning the write gap layer 19 by photolithography. Further, a pole tip 20 for determining a track width is formed on the write gap layer 19 by photolithography. That is, a magnetic layer of 2–4 $\mu$m in thickness made of high-saturation-flux-density materials (Hi-Bs materials) such as NiFe (Ni: 50 wt %, Fe: 50 wt %), NiFe (Ni: 80 wt %, Fe: 20 wt %), FeN, FeZrNP, CoFeN and the like by, for example, sputtering method. Further, the pole tip 20 is formed by selectively removing the magnetic layer by ion milling with, for example, Ar (argon) using a photoresist mask, and a connecting-portion pattern 20a for connecting the top pole and the bottom pole is formed. The bottom pole 18 and a top pole layer 25, which is to be described later, are connected through the connecting-portion pattern 20a so that forming a through hole after CMP procedure, which is to be described later, becomes easy. The pole tip 20 may be etched by using a mask made of an inorganic insulating layer such as alumina and the like instead of using photoresist. Further, it may be formed by plating method, sputtering method and so on other than such a method as photolithography.

Further, as shown in FIG. 4, with the pole tip 20 being a mask, its peripheral region of the write gap layer 19 is etched in a self-aligned manner. In other words, the write gap layer 19 is selectively removed by RIE (Reactive Ion Etching) using chlorine gas ($Cl_2$, $CF_4$, $BCl_2$, $SF_6$ and so on) with the pole tip 20 being a mask. After that, a recording track with a trim structure is formed through further etching the exposed bottom pole 18 about 0.3–0.6 $\mu$m by, for example, ion milling with Ar while convex areas 18a are formed.

Next, as shown in FIG. 5, an insulating layer 21a of 0.5–1.5 $\mu$m in thickness, which is made of such as alumina, is formed on the whole surface of the bottom pole 18 including the convex areas 18a by, for example, sputtering method or CVD method. Further, a first layer of thin film coil 22 for an inductive-type recording head made of, for example, copper (Cu) is formed to 2–3 $\mu$m in thickness on the insulating layer 21a in the convex areas 18a by, for example, electroplating method.

Figures 6A, 6B:
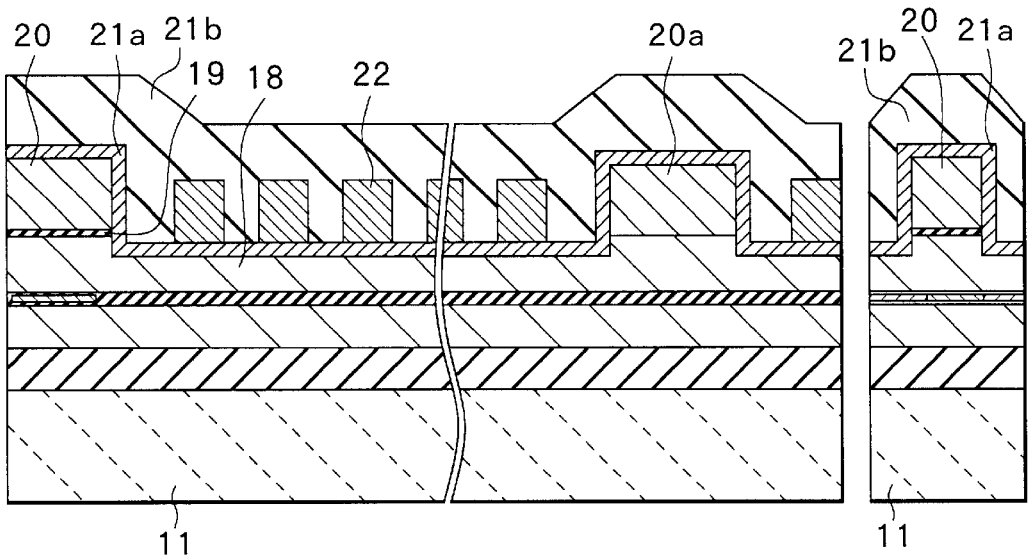
FIGS. 6A and 6B are cross sections for describing the following procedure shown in FIGS. 5A and 5B.

Next, as shown in FIG. 6, an insulating layer 21b of about 3–4 μm in thickness made of, for example, alumina is formed all over the surface including the thin film coil 22 in the convex areas 18a by, for example, sputtering method or CVD method. Further, the insulating layer 21a and the insulating layer 21b may be formed with other insulating materials such as silicon dioxide ($SiO_2$), silicon nitride (SiN) and so on, other than alumina.

Figures 7A, 7B:
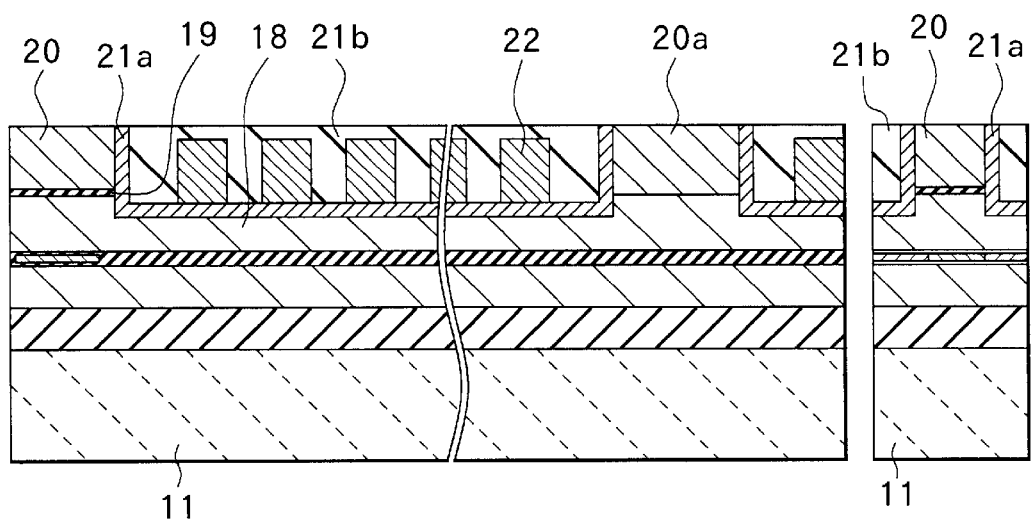
FIGS. 7A and 7B are cross sections for describing the following procedure shown in FIGS. 6A and 6B.

Next as shown in FIG. 7, the surfaces of the insulating layer 21b and the pole tip 20 are flattened to form the same surface by etching the insulating layer 21b and the insulating layer 21a until the surface of the pole tip 20 is exposed by CMP method. Further, the surfaces of the pole tip 20 and the thin film coil 22 may be formed to be the same surface.

Figures 8A, 8B:
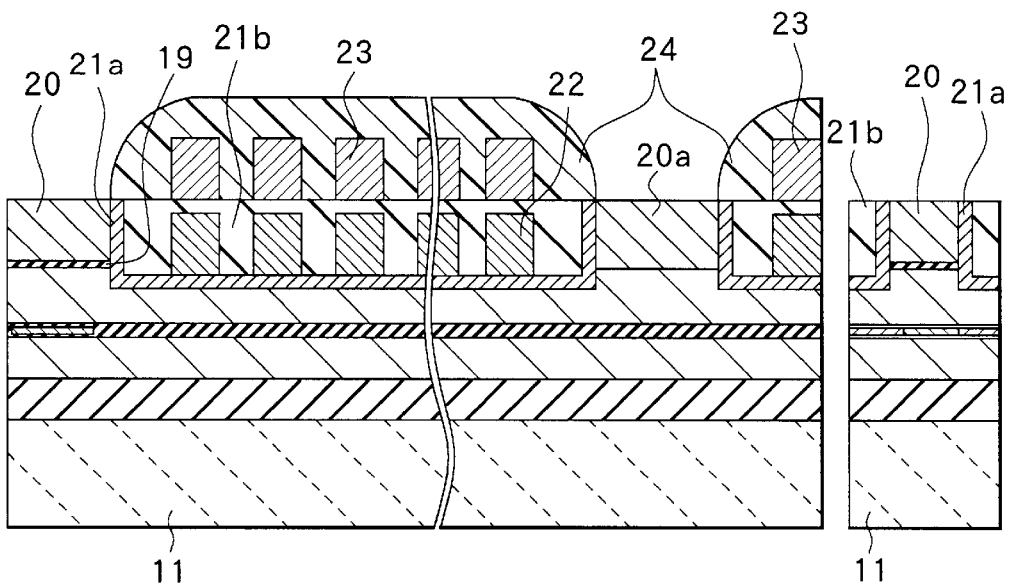
FIGS. 8A and 8B are cross sections for describing the following procedure shown in FIGS. 7A and 7B.

Next, as shown in FIG. 8, a second layer of thin film coil 23 for an inductive-type recording head made of, for example, copper (Cu) is formed to 2–3 μm in thickness on the flattened insulating layer 21b by, for example, electroplating method. Further, a photoresist film 24 is formed to a predetermined pattern on the thin film coil 23 by photolithography with high precision. Next, a heat treatment (annealing) of about, for example, 200° C. is applied in order to flatten the photoresist film 24 and insulate between the turns of the thin film coil 23.

Next, as shown in FIG. 9, the top pole layer 25 is formed to about 3–4 μm in thickness using, for example, the same material as the pole tip 20 by photolithography. Further, the top pole layer 25 may also be formed by other method such as electroplating method, sputtering method and so on. The top pole layer 25 is in contact and magnetically coupled to the bottom pole 18 through connecting-portion pattern 20a in a position recessed from the thin film coils 22 and 23. At last, however not shown in figure, an over coat layer of about 30 μm in thickness which is made of alumina is formed on the top pole layer 25 by, for example, sputtering method. After that, a thin film magnetic head is completed through forming a track surface (ABS) 27 of the recording head and the reproducing head by performing a machine processing on the slider.

As described, in the embodiment, the top pole is divided into the pole tip 20 and the top pole layer 25, and the pole tip 20 is made to be formed on a flat surface of the bottom pole 18. As a result, the pole tip 20 which controls the recording track width can be precisely formed to submicron measurement. In addition, in the embodiment, the first layer of thin film coil 22 is buried in the coil forming region 26 by the insulating layer 21b while the surface of the insulating layer 21b is flattened so as to form the same surface as the pole tip 20. That means, difference in the height of the apex area including the thin film coil 23 becomes less than that of the related art for the size of the thin film coil 22. Accordingly, when the top pole layer 25 which is partially in contact with the pole tip 20 is formed by photolithography, difference in thickness of the photoresist film in the top and the bottom of the apex area is decreased. As a result, submicron measurement of the top pole layer 25 can be made finer. Accordingly, with the thin film magnetic head obtained through the embodiment, high surface density recording by a recording head becomes possible and performance of the recording head can be further improved by laminating coils to two to three layers, or more. Further, micronizing of the pole tip 20 and the top pole layer 25 can be more precisely achieved by using an inorganic insulating layer as a mask instead of using photoresist at the time of photolithography of the pole tip 20 and the top pole layer 25.

Further, also in a case where the pole tip 20 and the top pole layer 25 are formed by sputtering method other than photolithography, likewise, an effect of difference in the apex area can be decreased so that micronizing of the pole tip 20 and the top pole layer 25 can be achieved.

Further, in the embodiment, the magnetic layers such as the pole tip 20, the top pole layer 25 and so on are formed with a high-saturation-flux-density (Hi-Bs) material. As a result, even if the track width becomes narrow, magnetism generated in the thin film coils 22 and 23 effectively reaches the pole tip 20 without saturating on the way so that a recording head without magnetic loss can be implemented.

Further, in the embodiment, the insulating layer 21a is formed between the thin film coils 22, 23 and the top shield-cum-bottom pole 18. As a result, large dielectric pressure-resistance can be obtained between the thin film coils 22, 23 and the top shield by adjusting the thickness of the insulating layer 21a so that the insulating characteristic can be maintained while leaking of magnetic flux from the thin film coils 22 and 23 can be decreased.

Further, in the embodiment, throat height is determined by the pole tip 20 so that a pattern shift of an edge frame and deterioration of profile do not occur, unlike the photoresist film of the related art. As a result, precise control of the throat height becomes possible. Further, precise controls of the MR height and the apex angle also become possible.

As described, according to the embodiment, a thin film magnetic head with a high-performance-narrow-track structure in which both of the pole tip 20 and the top pole layer 25 can be processed to submicron measurement while the throat height and the MR height are precisely controlled, and increase in the effective track width by spread of magnetic flux, which is generated at the time of writing of the narrow track, can be suppressed.

Other embodiments of the invention will be described in the followings. Further, in the following description, like numerals are adopted to the same elements of the configurations as the first embodiment and the description will be omitted. The distinctive part of the embodiment will only be described.

[Second Embodiment]

Figures 10A, 10B:
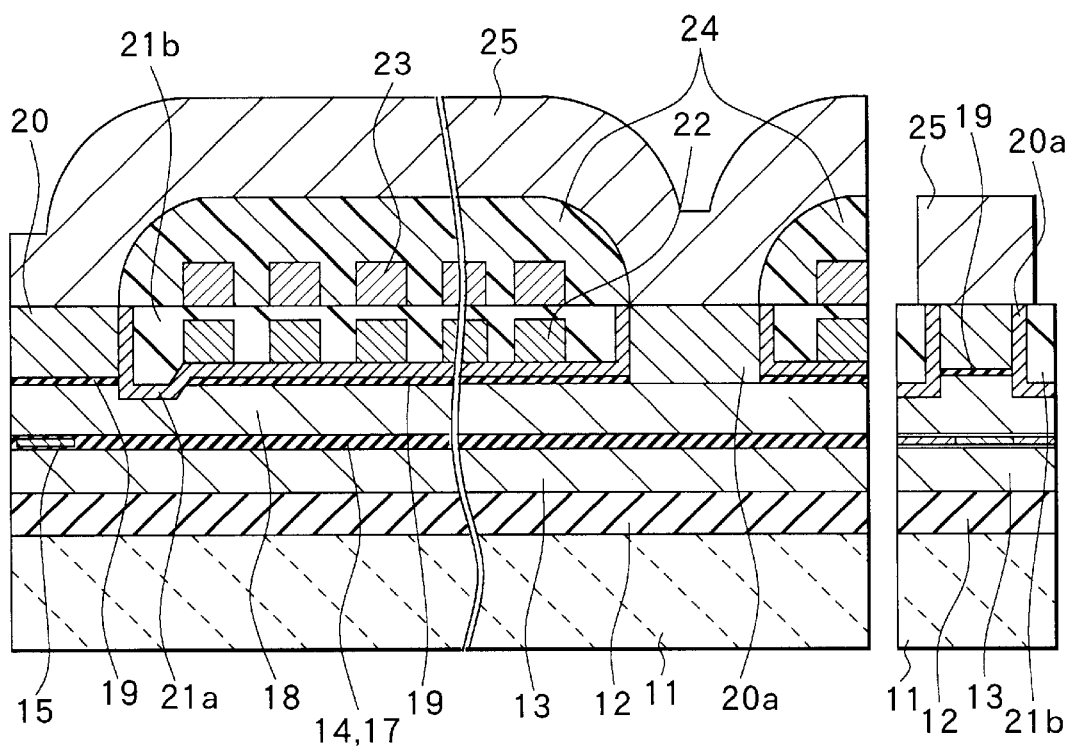
FIGS. 10A and 10B are cross sections for describing the configuration of a thin film magnetic head according to a second embodiment of the invention.

FIGS. 10A and 10B show the configuration of a composite thin film magnetic head according to a second embodiment of the invention. In the above-mentioned embodiment, the whole portion of the write gap layer 19 is also etched when the bottom pole 18 is etched to form the concave areas 18a. In this embodiment, however, part of the write gap layer 19 is made to be remained. As a result, in the embodiment, leaking of magnetic flux between the top pole layer 25 and the bottom pole 18 can be further decreased comparing to that of the first embodiment. Further, amount of etching performed on the bottom pole 18 is less than that of the first embodiment so that it does not become thin. Accordingly, here, saturation of magnetic flux does not occur. Other effects are similar to those of the first embodiment.

[Third Embodiment]

Figures 11A, 11B:
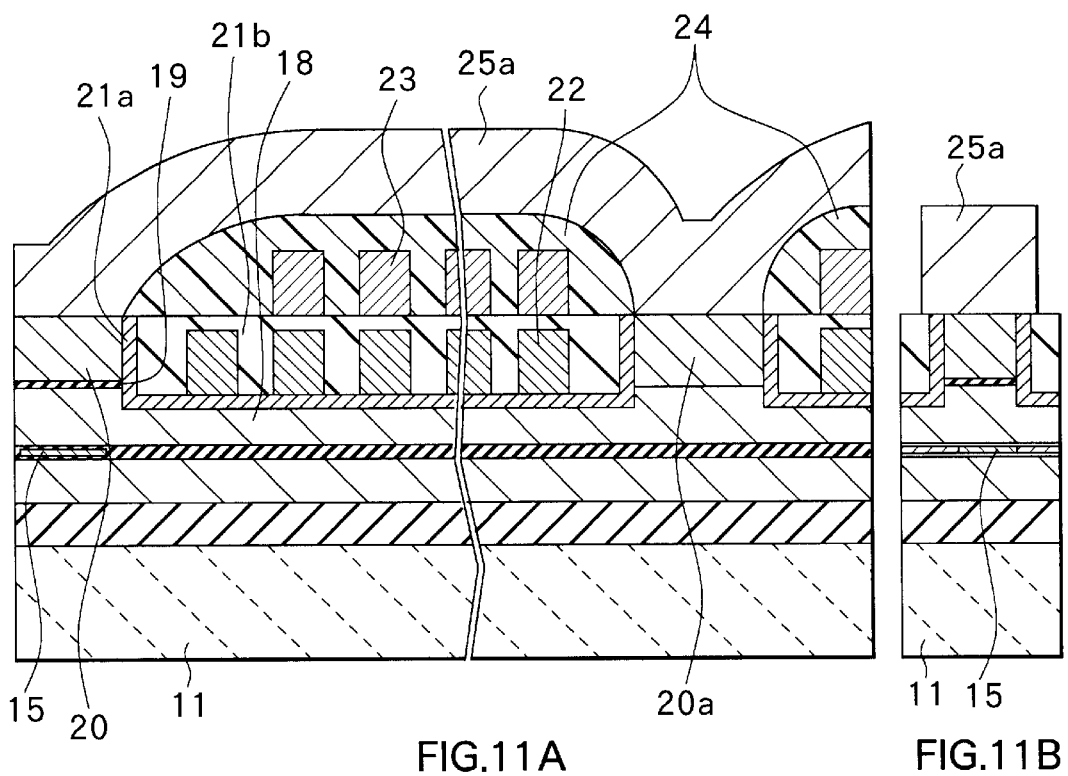
FIGS. 11A and 11B are cross sections for describing the configuration of a thin film magnetic head according to a third embodiment of the invention.

A composite thin film magnetic head according to the embodiment, as shown in FIGS. 11A and 11B, is formed to have a configuration in which the number of turns of the most outer (here, second layer) thin film coil 23, which is formed most adjacent to the top pole layer 25 of the coil portion with a laminating structure, is made to become less than that of the lower layer (first layer) of thin film coil 22. In the embodiment, one of the coil on the track side of the thin film coil 22 is taken out. As a result, the slope of the photoresist film 24 which covers the upper layer of thin film coil 23 and determines the apex angle becomes more gentle comparing to that of the first embodiment. Through making the angle of the apex area gentle as described, micronizing the photoresist film for patterning the top pole layer 25a becomes possible. As a result, micronizing the top pole layer 25 becomes easier.

[Fourth Embodiment]

Figures 12A, 12B:
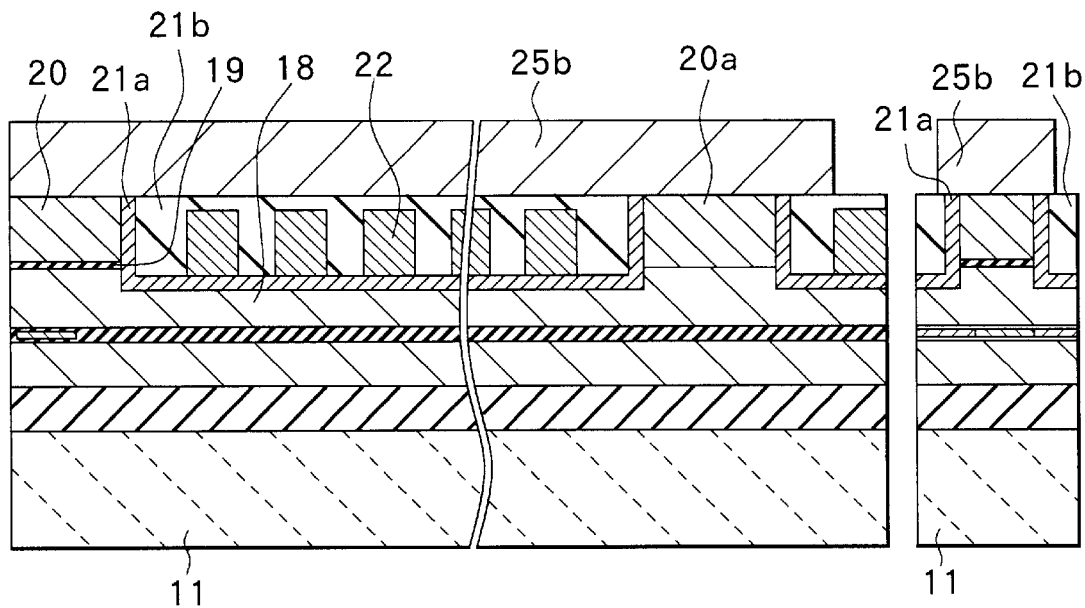
FIGS. 12A and 12B are cross sections for describing the configuration of a thin film magnetic head according to a fourth embodiment of the invention.

A composite thin film magnetic head according to the embodiment, as shown in FIGS. 12A and 12B, has a configuration in which the coil portion is a single-layered structure composed of the thin film coil 22 and the thin film coil 22 is formed with narrower pitch than that of the above-mentioned embodiment, while the top pole layer 25b is formed on the pole tip 20 and the insulating layer 21b. As a result, the top pole layer 25b can be directly formed on the flat surface formed by the pole tip 20 and the insulating layer 21b. Accordingly, micronizing the track width of a recording head can be further achieved comparing to the above-mentioned embodiment.

[Fifth Embodiment]

Figures 13A, 13B:
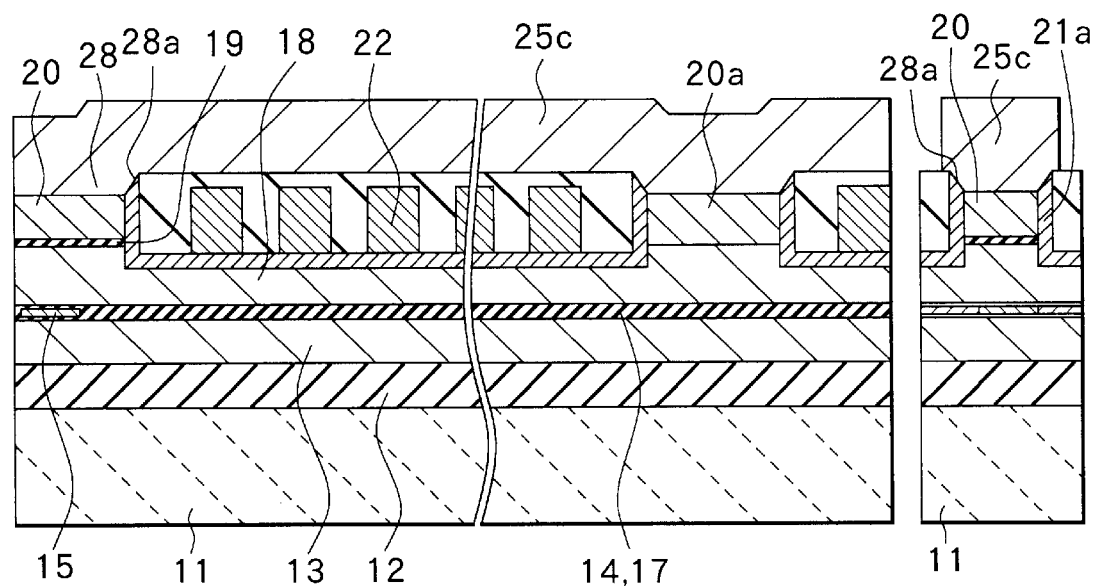
FIGS. 13A and 13B are cross sections for describing the configuration of a thin film magnetic head according to a fifth embodiment of the invention.

A composite thin film magnetic head according to the embodiment, as shown in FIGS. 13A and 13B, has a configuration in which concave areas 28 are formed on the surface of the pole tip 20. In other words, as described in the procedure shown in FIG. 6 and FIG. 7 in the first embodiment, after the insulating layer 21b is formed on the whole surface including the thin film coil 22 in the concave areas 18a and is flattened so that the surface of the pole tip 20 is exposed, an concave areas 28 and a taper surface 28a are formed through etching part of the exposed pole tip 20 (and the insulating layer 21a) by ion milling with Ar to a depth of about 0.3 $\mu$m or more, as shown in FIGS. 13A and 13B. Further, a top pole layer 25c is formed from the concave areas 28 to the insulating layer 21b covering the coil 22 and the connection portion pattern 20a.

In the embodiment with such a configuration, a taper surface 26a is formed on the insulating layer 21a on both sides of the pole tip 20, and the pole tip 20 and the top pole layer 25c are not in contact vertically. As a result, saturation of magnetic flux in the area does not occur so that flux rise time becomes shorter and side-writing is prevented from occurring. Accordingly, writing performance is improved. Other effects of the embodiment is similar to those of the first embodiment.

Figure 14:
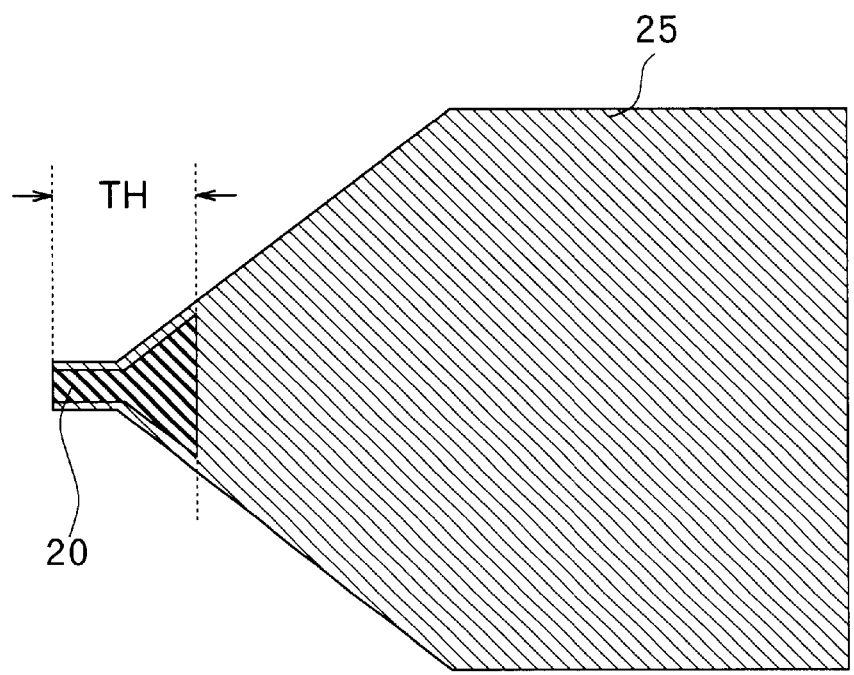
FIG. 14 is a plan view of a thin film magnetic head manufactured through the first embodiment.
Figure 15:
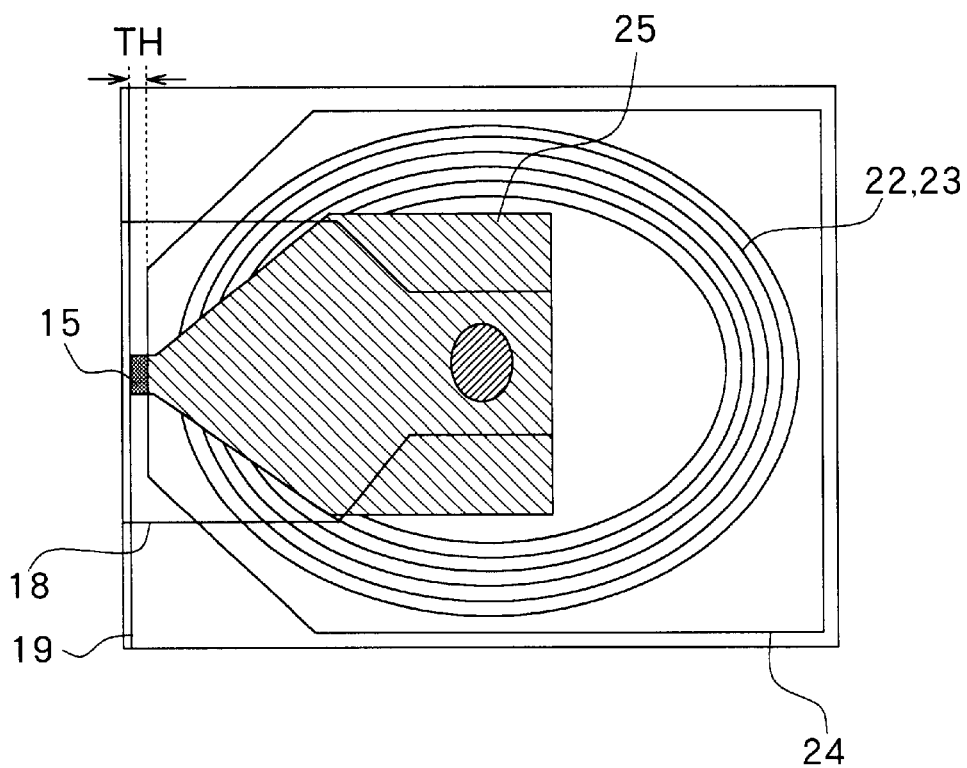
FIG. 15 is a plan view specifically showing the pole tip and the top pole of the thin film magnetic head shown in FIG. 14.
Figures 21A, 21B:
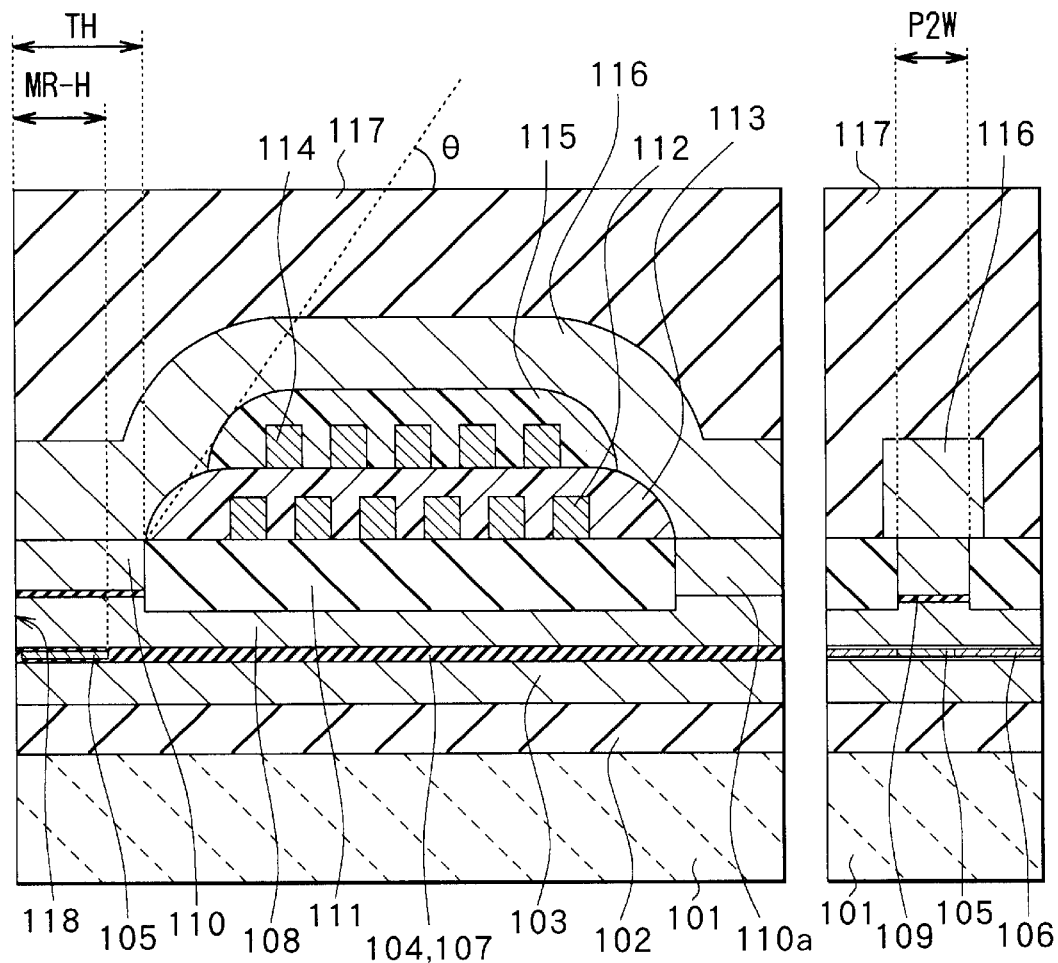
FIGS. 21A and 21B are cross sections for describing the following procedure shown in FIGS. 20A and 20B.

Further, FIG. 14 is a plan view of a thin film magnetic head according to the embodiment. FIG. 15 is a plan view specifically showing the pole tip 20 and the top pole layer 25. FIG. 15 shows a state before performing machine processing on the slider. In these figures, TH represents throat height and the throat height TH is determined by the edge frame of the magnetic-pole side of the insulating layer 21a and the insulating layer 21b which are buried in the coil forming portion 26 as described. Further, saturation of magnetic flux can be also suppressed by forming the pole tip 20 in a shape of, for example, a funnel, as shown in FIG. 14 making the width of the coil side being made wider than that of the track surface side.

The invention has been described by referring to the above-mentioned embodiments, however, it is not limited to the embodiments but various modification can be applicable. For example, in the above-mentioned embodiments, an example of using a high-saturation-flux-density material such as FeN or FeCoZr for the pole tip 20 and the top pole layers 25, 25a, 25b and 25c in addition to using NiFe (Ni: 50 wt %, Fe: 50 wt %), NiFe (Ni: 80 wt %, Fe: 20 wt %) is described, however, they may have a configuration in which two or more kinds of these materials are laminated.

Further, in the embodiment, the thin film coil which is to be buried in the coil forming portion 26 is a single layer, however, it may have a laminated structure in which two or more coils are buried.

Further, the second magnetic layer (top pole layer 25) is not necessarily required to be exposed on the side of the medium-facing-surface (air bearing surface). That means, the second magnetic layer is not required to be in contact with the whole surface of the pole tip but may be in contact in a position recessed to inner side (for example, right-hand side in FIG. 9) from the medium-facing-surface. In such a case, the second magnetic layer is coated by an over coat layer so that it is not exposed onto the medium-facing-surface.

Further, in the above-mentioned embodiments, a method of manufacturing a composite thin film magnetic head is described, however, the invention can be applied to manufacturing of a thin film magnetic head for recording only having an inductive-type magnetic transducer for writing or a thin film magnetic head for both recording and reproducing. Further, the invention can be applied to manufacturing of a thin film magnetic head with a configuration in which the order of laminating the element for writing and the element for reading-out is reversed.

As described above, according to the thin film magnetic head or a method of manufacturing a thin film magnetic head of the invention, difference in height of the apex area including the coil becomes smaller than that of the related art, since the first insulating layer is formed extendedly from the surfaces of the pole tip and the write gap layer which are opposite of the side facing the recording medium to one of the surface of the first magnetic layer and the thin film coil is formed in the region where the first insulating layer is formed, while at least between the turns of the thin film coil is made to be buried with the second insulating layer. As a result, an effect of difference in height of the apex area can be decreased when the second magnetic layer (top pole layer), which is partially in contact with the pole tip as the second magnetic pole, is formed by photolithography and so on. Accordingly, the second magnetic layer, together with the pole tip, can be micronized to submicron measurement and writing performance of the recording head can be remarkably improved.

What is claimed is:

1. A thin film magnetic head having at least two magnetic layers including at least a first magnetic pole and a second magnetic pole being magnetically coupled to each other while part of sides facing a recording medium face each other with a write gap layer in between, and having one or more layers of thin film coil for generating magnetic flux, comprising:

a first magnetic layer including the first magnetic pole;

a pole tip for composing the second magnetic pole;

a first insulating layer formed extendedly at least from the surfaces of the pole tip and the write gap layer which are opposite of sides facing the recording medium to one of the surface of the first magnetic layer;

at least one layer of the thin film coil with at least part of its film-thickness direction being formed in a region where the first insulating layer is formed;

a second insulating layer formed at least between turns of the thin film coil;

a second magnetic layer formed to cover at least part of the thin film coil while being connected to at least part of the surface of the pole tip which is opposite of the neighboring surface of the write gap layer; and wherein the write gap layer is sandwiched at least in part between the first magnetic layer and the first insulating layer.

2. The thin film magnetic head according to claim 1 wherein the first insulating layer is formed along both sides of the pole tip except an edge surface thereof which faces the recording medium.

3. The thin film magnetic head according to claims 1 or 2 wherein the first insulating layer is formed extendedly from a surface of the pole tip which is opposite of a side facing the recording medium to a surface of the second magnetic layer which is opposite of a side facing the recording medium.

4. The thin film magnetic head according to claim 1 wherein the whole thin film coil in a film-thickness direction is formed in a region where the first insulating layer is formed.

5. The thin film magnetic head according to claim 1 wherein a surface of the thin film coil which is opposite a surface adjacent to the first insulating layer is formed to be substantially leveled with a surface of the pole tip which is opposite a surface adjacent to the write gap layer.

6. The thin film magnetic head according to claim 1 wherein the first insulating layer is formed with an inorganic insulating material.

7. The thin film magnetic head according to claim 1 wherein a concave area is formed on at least part of a surface of the first magnetic layer on the pole tip side.

8. The thin film magnetic head according to claim 7 wherein the first insulating layer is formed on a surface of the concave area of the first magnetic layer, which is opposite of a side facing the recording medium.

9. The thin film magnetic head according to claim 1 wherein the second insulating layer is formed to be substantially leveled with a surface of the pole tip which is opposite a surface adjacent to the write gap layer.

10. The thin film magnetic head according to claim 1 wherein the second insulating layer is also formed between the first insulating layer and the thin film coil.

11. The thin film magnetic head according to claim 1 wherein at least one layer of the thin film coil, which is formed by being covered with a third insulating layer, other than the first and the second insulating layers, is further formed between the second insulating layer and the second magnetic layer.

12. The thin film magnetic head according to claim 1, wherein the number of turns of the most outer thin film coil formed closest to the second magnetic layer among the thin film coil is less than that of the thin film coil with at least part of its film-thickness direction being formed in the region where the first insulating layer is formed, and a slope of an insulating layer which covers the most outer side thin film coil and determines an apex angle is gentle.

13. The thin film magnetic head according to claim 1, wherein the thin film coil covered by the first insulating layer and the second insulating layer, and the thin film coil covered by a third insulating layer, other than the first and second insulating layers, are electrically connected in a boundary surface between the second insulating layer and the third insulating layer.

14. The thin film magnetic head according to claim 1 wherein the width of a side of the pole tip which is opposite of a side facing the recording medium is formed to be wider than the width of a side facing the recording medium.

15. The thin film magnetic head according to claim 1 further including a magnetoresistive element for reading-out.

\* \* \* \* \*